United States Patent
Iwata

(10) Patent No.: US 6,398,687 B2
(45) Date of Patent: Jun. 4, 2002

(54) LUBRICATING CONSTRUCTION FOR A FINAL REDUCTION GEAR UNIT

(75) Inventor: Mitsuhiro Iwata, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/739,287

(22) Filed: Dec. 19, 2000

(30) Foreign Application Priority Data

Dec. 21, 1999 (JP) ............................................ 11-362972

(51) Int. Cl.⁷ .............................................. F16H 57/04
(52) U.S. Cl. ....................................................... 475/160
(58) Field of Search ........................ 475/160; 74/606 R

(56) References Cited

U.S. PATENT DOCUMENTS

| | | | | | |
|---|---|---|---|---|---|
| 3,182,527 A | * | 5/1965 | Bryan | ........................ | 475/160 |
| 4,157,045 A | * | 6/1979 | Suzuki | ........................ | 475/160 |
| 4,175,643 A | * | 11/1979 | Jenkins | ..................... | 184/11 A |
| 6,126,565 A | * | 10/2000 | Irwin | ........................ | 475/160 |

FOREIGN PATENT DOCUMENTS

| | | |
|---|---|---|
| JP | 2-62412 | 12/1990 |
| JP | 3-118350 | 12/1991 |

* cited by examiner

*Primary Examiner*—Dirk Wright
(74) *Attorney, Agent, or Firm*—Armstrong, Westerman & Hattori, LLP

(57) ABSTRACT

A final reduction gear unit comprises a small diameter pinion gear 10, a large diameter ring gear 20 which meshes with the small diameter ring gear 10, a housing for accommodating the two gears, first bearings 26a, 26b for rotatably supporting the large diameter ring gear and second bearings 15a, 15b for rotatably supporting the small diameter pinion gear. Moreover, a gutter member 30 is provided within the housing for receiving the part of lubricating oil thrown up and splash supplied toward the second bearings by the rotation of the large diameter ring gear, and a lubricating oil supply path 6a, 6b, 7a, 7b is formed within the housing which links up with the first bearings at one end and with the gutter member at the other end thereof.

6 Claims, 4 Drawing Sheets

LUBRICATING CONSTRUCTION FOR A FINAL REDUCTION GEAR UNIT

BACKGROUND OF THE INVENTION

1. Field of the Invention

The present invention relates to a final reduction gear unit for transmitting a driving force transmitted from a drive shaft (for example, a transmission output shaft) of an automobile or the like to axles extending transversely of a vehicle body so as to link up with left and right wheels, and more particularly to a lubricating construction for the final reduction gear unit.

2. Description of the Related Art

Generally speaking, a final gear reduction unit is a device provided for reducing the speed of a rotational driving force from a drive shaft of an automobile or the like for transmission to left and right axles linking up with left and right wheels. The final gear reduction unit is constituted by a small diameter pinion gear which rotates when receiving a rotational driving force from the drive shaft and a large diameter ring gear meshing with the small diameter pinion gear and linking up with the axles coaxially which are both disposed within a housing. Note that normally there is provided a differential mechanism between the large diameter ring gear and the left and right axles, whereby the rotational driving force from the large diameter ring gear is split so as to be transmitted to the left and right axles by the action of the differential mechanism. In the final reduction gear unit constructed as described above, lubricating oil is supplied into the housing, and the lubricating oil so supplied in the housing is then thrown up in response to the rotations of respective gears or the like for lubrication of respective portions, and it is common practice that a forced lubrication using an oil pump is not performed. In this case, there occurs a demand for sufficiently supplying the lubricating oil thrown up by the rotations of the gears or the like to portions within the housing which need lubrication.

From this reason, JP-B-2-62412 discloses the lubrication of a side bearing by providing an oil gutter for collecting lubricating oil thrown up by the rotations of a large diameter drive gear and a gear box (a gear box accommodating therein a differential mechanism), and guiding the thrown up lubricating oil to a side bearing through the oil gutter for lubricating the side bearing. A final reduction gear unit disclosed in this publication is a so-called a final reduction gear unit provided in a transverse-mounted transmission, and spur gears (spur wheels) are used for a small diameter drive gear and the large diameter drive gear. According to the construction of the final reduction gear unit disclosed, only the lubrication of the side bearing is required which rotatably supports the large diameter drive gear and the gear box integrally assembled to the large diameter drive gear and having the differential mechanism. Note that the small diameter drive gear is disposed on an output shaft of the drive shaft, and the sufficient lubrication is performed within the housing.

Additionally, JP-A-3-118350U discloses a final reduction gear unit comprising a small diameter pinion gear adapted to be rotatively driven when output rotations of a transmission are transmitted thereto via a propeller shaft and a large diameter ring gear meshing with the small diameter pinion gear and linking up with left and right axles coaxially via a differential mechanism, which are both accommodated and disposed within a housing. This publication also discloses a construction in which a bearing for rotatably supporting the small diameter pinion gear is lubricated. Note that the large diameter ring gear is rotatably supported by a bearing relative to the housing such that the ring gear freely rotates about a shaft extending in a transverse direction of a vehicle (a lateral direction), while the small diameter pinion gear is rotatably supported by the separate bearing relative to the housing such that the pinion gear freely rotates about a shaft extending a longitudinal direction of the vehicle.

In the final reduction gear unit, however, in which the small diameter pinion gear and the large diameter ring gear are disposed within the housing as described above, since the respective portions are in general constructed to be lubricated with the lubricating oil thrown up by the rotation of the gear (namely, since there is adopted no construction in which an oil pump is used for forced lubrication), it is very significant how the thrown up lubricating oil is distributed and supplied properly to those portions needing lubrication. Even in the related art constructions described above, there have been devised various ideas on how to supply the lubricating oil, but it is now desired that the supply of lubricating oil is performed with a further appropriate distribution of lubricating oil.

SUMMARY OF THE INVENTION

The present invention was made in view of these situations, and an object thereof is to provide a lubricating construction for a final reduction gear unit in which a small diameter pinion gear and a large diameter ring gear are disposed within a housing, wherein a bearing for rotatably supporting the small diameter pinion gear and a bearing for rotatably supporting the large diameter ring gear are supplied with lubricating oil under a proper distribution and in a sufficient amount at all times.

With a view to attaining the above object, according to an aspect of the invention, there is provided a final reduction gear unit constructed so as to have a small diameter pinion gear adapted to be driven to rotate by receiving output rotations from a drive shaft, a large diameter ring gear meshing with the small diameter pinion gear and linking up with left and right axles coaxially, a housing accommodating therein the small diameter pinion gear and the large diameter ring gear, first bearings (for example, taper roller bearing 26a, 26b in an embodiment) for rotatably supporting the large diameter ring gear relative to the housing, and second bearings (for example, taper roller bearings 15a, 15b in the embodiment) for rotatably supporting the small diameter pinion gear relative to the housing. Then, a gutter member is provided for receiving a part of lubricating oil which is thrown up by the rotation of the large diameter ring gear so as to be supplied to the second bearing in a splashing fashion, and a lubricating oil supply path (for example, first and second lubricating oil supply holes 6a, 6b, 7a, 7b in the embodiment) is formed in the housing (for example, comprising a housing 1 and retainers 5a, 5b in the embodiment) which links up with the first bearings at one end and with the gutter at the other end thereof.

In the lubricating construction constructed as described above, in transmitting output rotations of the drive shaft to the left and right axles and wheels via the final reduction gear unit, when the lubricating oil within the housing is thrown up by the rotation of the large diameter ring gear, the lubricating oil so thrown up is then supplied to the second bearing in a splashing fashion. However, the part of the lubricating oil is received in the gutter member and is supplied into the lubricating oil supply path for supply to the first bearings via the lubricating oil path, and therefore, not only the second bearings but also the first bearings are properly lubricated at all times.

Preferably, a splash guide space is formed in the housing for guiding the lubricating oil thrown up by the rotation of the large diameter ring gear toward the second bearing in a splashing fashion, and the gutter member is provided such that the gutter member extends in a transverse direction so as to partially close the splash guide space. According to this construction, the lubricating oil thrown up by the rotation of the large diameter ring gear is then splashed on the second bearing through the splash guide space for lubricating the second bearing, and simultaneously, a part of the lubricating thrown up is received in the gutter member for supply to the first bearings, whereby the first bearings are lubricated. Namely, both the first and second bearings are properly lubricated at all times.

DETAILED DESCRIPTION OF THE PREFERRED EMBODIMENTS

Figure 1:
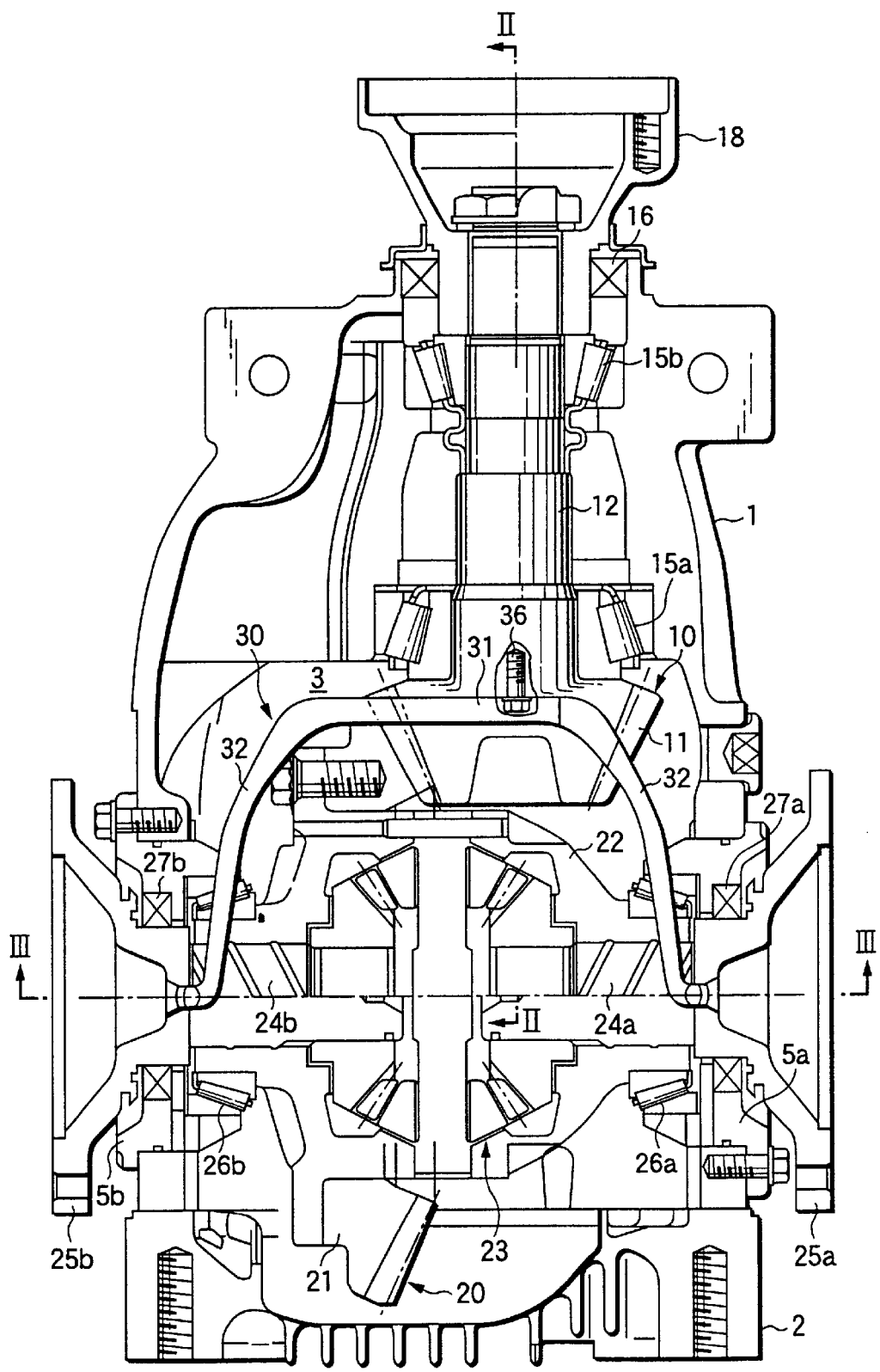
FIG. 1 is a sectional view showing a final reduction gear unit having a lubricating construction according to the invention.

Referring to the accompanying drawings, a preferred embodiment will be described. An example of a final reduction gear unit adopting a lubricating construction according to the invention is shown in FIG. 1. This final reduction gear unit is constructed so as to have a small diameter pinion gear 10, a large diameter ring gear 20, and a differential mechanism 23 which are disposed within an interior space 3 constituted by a final reduction gear housing 1 and a cover 2.

The small diameter pinion gear 10 includes a pinion shaft 12 having a first bevel gear 11 at one end thereof. The pinion shaft 12 is rotatably supported by a pair of taper roller bearings 15a, 15b. The pinion shaft 12 protrudes outwardly of the housing 1 and is fixedly provided on an input shaft joint 18 at the other end thereof. The input shaft joint 18 links up with a transmission output shaft via, for example, a propeller shaft (not shown), extending in a longitudinal direction of a vehicle body so that engine outputs shifted in speed by a transmission can be transmitted to the input shaft joint 18 via the propeller shaft to thereby rotatively drive the joint 18. Note that an oil seal 16 is provided at a position where the pinion shaft 12 protrudes outwardly of the housing 1 for preventing oil within an interior space 3 in the housing from flowing out thereof.

The large diameter ring gear 20 includes a second bevel gear 21 meshing with the first bevel gear 11 and a differential case 22 that is rotatably supported by a pair of left and right taper roller bearings 26a, 26b relative to the housing 1 and to which the second bevel gear 21 is connected. The large diameter ring gear 20 is constructed so as to be rotatable on a rotating shaft extending in a direction normal to a rotating shaft of the small diameter pinion gear 10 (in a transverse direction of the vehicle body). Note that the pair of left and right taper roller bearings 26a, 26b are held on the housing 1 via retainers 5a, 5b, respectively.

A differential mechanism 23 is disposed inside the differential case 22 for splitting the rotation of the large diameter ring gear to left and right differential output shafts 24a, 24b for transmission of the same thereto. The left and right differential output shafts 24a, 24b link up with left and right output joints 25a, 25b, respectively, from which a driving force is transmitted to left and right wheels (not shown). In addition, oil seals 27a, 27b are interposed between the output joints 25a, 25b and the retainers 5a, 5b for preventing oil within the interior space 3 in the housing from flowing out thereof.

Figure 2:
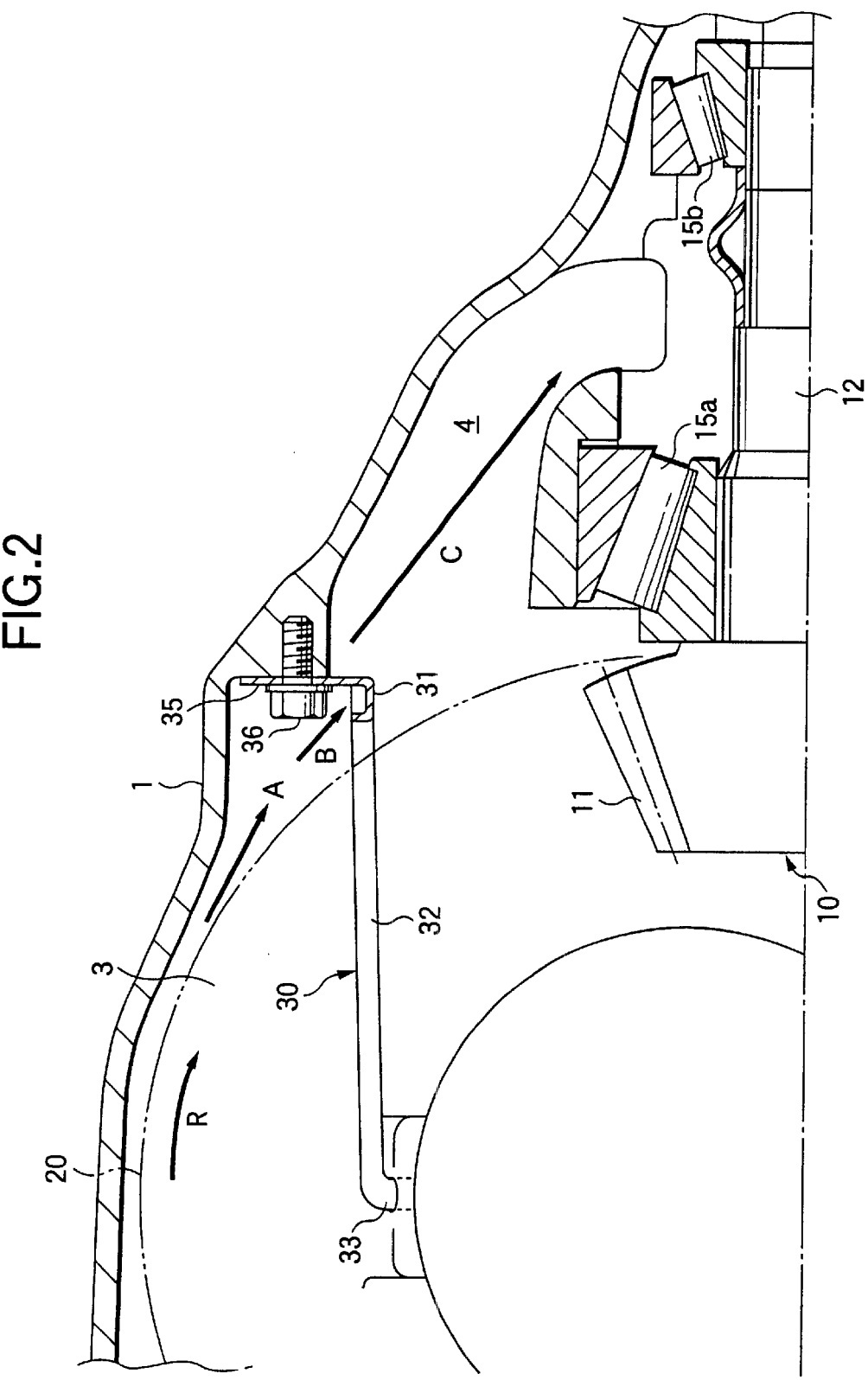
FIG. 2 is a sectional view taken along arrows II—II of FIG. 1 showing a part of the final reduction gear unit.
Figure 3:
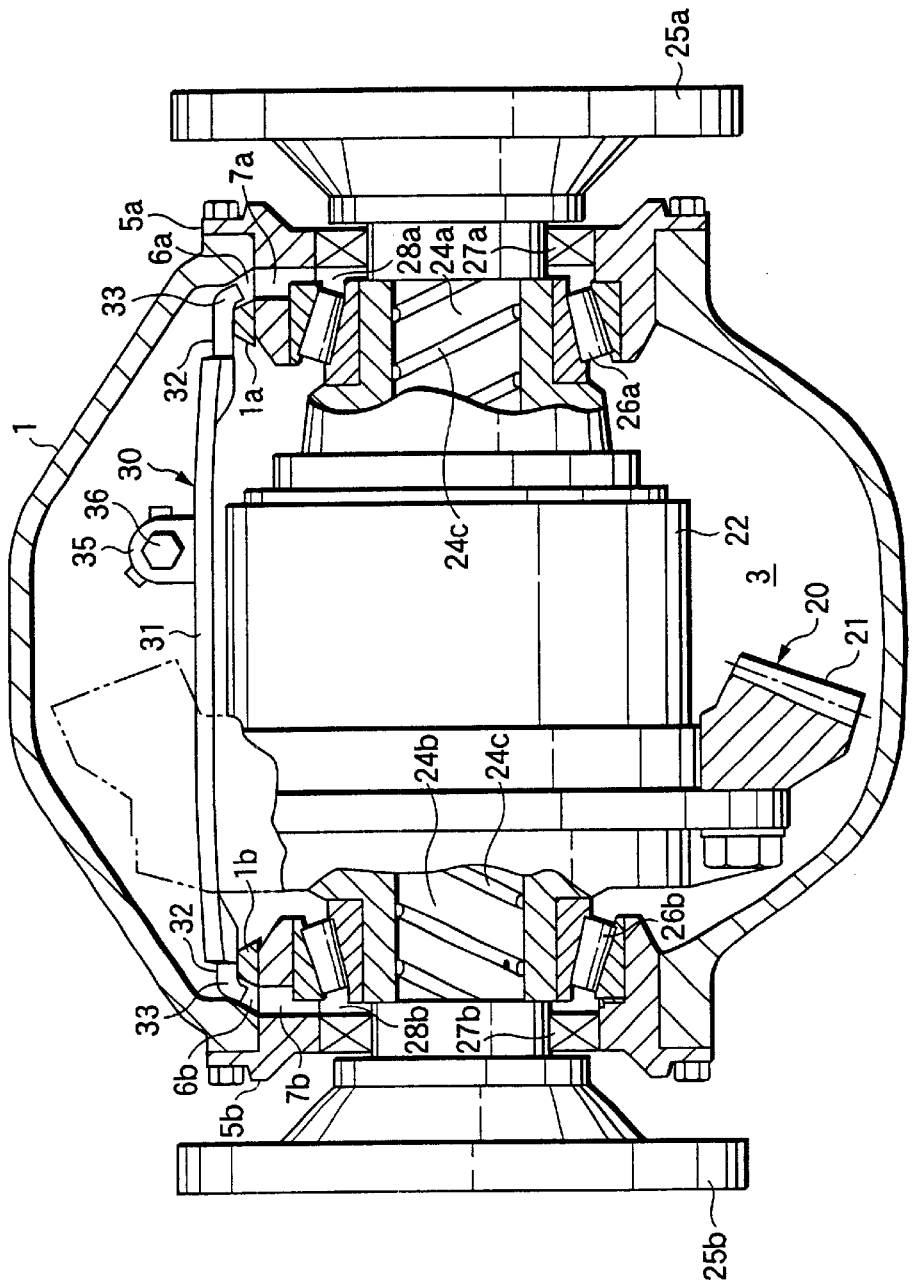
FIG. 3 is a sectional view taken along arrows III—III of FIG. 1 showing a part of the final reduction gear unit.

FIGS. 2 and 3 show sectional views of the final reduction gear unit constructed as described above taken along the lines indicated by arrows II—II and III—III of FIG. 1, respectively. In the final reduction gear unit, lubricating oil is put in the interior space 3 in the housing, and the lubricating oil is thrown up and splashed on respective portions by the large diameter ring gear 20 as it rotates, whereby the respective portions are lubricated. The housing 1, the small diameter pinion gear 10 and the taper roller bearings 15a, 15b are shown in FIG. 2 with the large diameter ring gear 20 and the differential mechanism 23 being removed. Note that the outside diameter of the large diameter ring gear 20 is shown in double-dashed lines.

When the vehicle runs forward, the large diameter ring gear 20 rotates clockwise as shown by an arrow R in FIG. 2, and the lubricating oil thrown up by the large diameter ring gear 20 is then splashed as indicated by an arrow A. A splash guide space 4 is formed at an upper portion of the interior space 3 in the housing 1 in such a manner as to extend and connect to a position between the two taper roller bearings 15a, 15b so that the thrown up lubricating oil is used for lubricating the taper roller bearings 15a, 15b. In this construction, the lubricating oil splashed in the direction as shown by the arrow A passes through the splash guide space 4 as shown by an arrow C and is then supplied to the two taper roller bearings 15a, 15b, whereby the taper roller bearings 15a, 15b are lubricated well.

In the final reduction gear unit according to the embodiment, there is provided a gutter member 30 extending transversely across the splash guide space 4 formed as described above. The gutter member 30 includes a gutter main body portion 31 extending transversely while closing a part of the guide space 4, a mounting tongue-like portion 35 linking up with the gutter main body portion 31 and extending upwardly, a pair of side gutter portions 32 extending rearward from end portions of the gutter main body portion 31 and outflow guide portions 33 linking up with rear ends of the side gutter portions 32. The gutter member 30 is fixed to the housing 1 with a bolt 36 at the mounting tongue-like portion 35. Note that the gutter main body portion 31, the side gutter portions 32 and the outflow guide portions 33 are formed to have a U-shaped cross section or into a gutter-like shape. Additionally, the side gutter portions 32 incline downwardly from the gutter main body portion 31 toward the outflow guide portions 33 and is formed such that lubricating oil flows smoothly from the gutter main body portion 31 toward the outflow guide portions 33.

Figure 4:
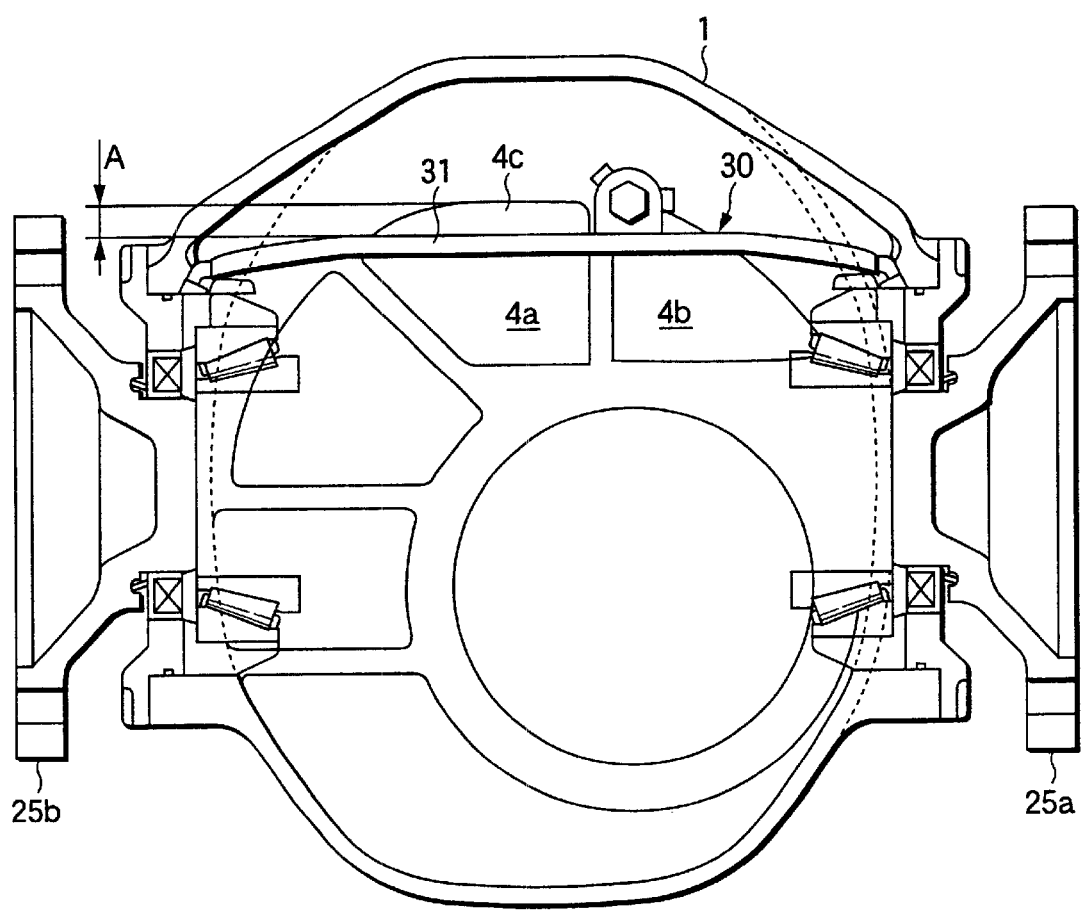
FIG. 4 is a sectional view taken along the arrows III—III of FIG. 1 showing the interior of a casing of the final reduction gear unit with a final reduction gear mechanism being removed.

As is clearly seen from FIG. 3, first lubricating oil supply holes 6a, 6b are provided, respectively, in upper ends of boss portions 1a, 1b for holding the retainers 5a, 5b, and second lubricating oil supply holes 7a, 7b are formed, respectively, in the retainers 5a, 5b in such a manner as to communicate with the first lubricating oil supply holes 6a, 6b, respectively. A lubricating oil supply path is constituted by the first and second lubricating oil supply holes 6a, 6b and 7a, 7b and the lubricating oil supply path so formed communicates with lubricating spaces 28a, 28b surrounded by the left and right taper roller bearings 26a, 26b and the left and right oil seals 27a, 27b. In addition, the outflow guide portions 33 located at the left and right end portions of the gutter member 30 protrude into the first lubricating oil supply holes 6a, 6b. Note that in FIG. 4 communicating openings 4a, 4b are shown, which establish communications between the interior space 3 in which the large diameter ring gear 20 is disposed and the splash guide space 4. As is seen from the figure, the gutter main body portion 31 is mounted so as to extend across the communicating openings 4a, 4b and an opening 4c having a width A is formed upwardly of the gutter main body portion 31.

Here, as is described above, when the vehicle runs forward, the large diameter ring gear 21 is driven to rotate in the direction indicated by the arrow R and the lubricating oil is splashed into the guide space 4 after passing through the opening 4c or the like as shown by the arrow A, the part of the splashed lubricating oil is received at the gutter main body portion 31 of the gutter member 30 disposed to extend across the guide space 4. The lubricating oil received at the gutter main body portion 31 as described above is split to flow into the left and right side gutter portions 32, thereby being supplied from the outflow guide portion 33 into the left and right lubricating spaces 28a, 28b via the first and second lubricating oil supply holes 6a, 6b, 7a, 7b. The lubricating oil supplied into the left and right lubricating space 28a, 28b as described above flows into the interior space 3 after passing through the left and right taper roller bearings 26a, 26b, whereby the left and right taper roller bearings 26a, 26b are lubricated well. In addition, the lubricating oil supplied into the lubricating spaces 28a, 28b is supplied to the interior of the differential case 22 through spiral grooves 24c formed in the differential output shafts 24a, 24b to thereby lubricate the interior of the differential case 22. Note that the amount of lubricating oil to be received at the gutter main portion 31 can be set optionally by modifying the size of the U-shaped opening thereof.

While only certain embodiments of the invention have been specifically described herein, it will apparent that numerous modifications may be made thereto without departing from the spirit and scope of the invention.

As has been described heretofore, according to the invention, the gutter member is provided in the housing for receiving the part of the lubricating oil that is thrown up by the rotation of the large diameter ring gear to be supplied toward the second bearings in a splash fashion, and the lubricating oil supply path is formed in the housing which links up with the first bearings at one end and with the gutter member at the other end thereof. Thus, according to the construction, for example, in transmitting output rotations of the transmission to the left and right axles and wheels via the final reduction gear unit, when the lubricating oil within the housing is thrown up by the rotation of the large diameter ring gear, the lubricating oil so thrown up is then splash supplied to the second bearings, when the part of the lubricating oil so splash supplied is received at the gutter member to thereby be supplied to the first bearings via the lubricating oil supply path, thus making it possible to perform proper lubrication of not only the second bearings but also the first bearings at all times.

In addition, it is preferable that the splash guide space is formed in the housing which guides the lubricating oil thrown up by the rotation of the large diameter ring gear so as to be splashed toward the second bearings and that the gutter member is provided so as to extend transversely in such a manner as to close the guide space partially. According to the construction, the lubricating oil thrown up by the rotation of the large diameter ring gear is splashed on the second bearings through the splash guide space for lubrication of the same, and at the same time as this, the part of the lubricating oil so thrown up is received at the gutter member so as to be supplied to the first bearings for lubrication of the same, as well. Namely, the thrown up lubricating oil is suitably distributed to the first and second bearings for proper lubrication of those bearings at all times.

What is claimed is:

1. A final reduction gear unit for transmitting a driving force transmitted from a drive shaft to axles extending transversely of a vehicle body and linking up with left and right wheels, comprising:
    a small diameter pinion gear being rotatively driven by receiving output rotations from said drive shaft;
    a large diameter ring gear meshing with said small diameter pinion gear and linking up with said axles coaxially;
    a housing accommodating therein said small diameter pinion gear and said large diameter ring gear;
    a first bearing for rotatably supporting said large diameter ring gear relative to said housing;
    a second bearing for rotatably supporting said small diameter pinion gear relative to said housing; and
    a lubricating unit lubricating said first and second bearings, said lubricating unit comprising:
    a gutter member provided in said housing for receiving a part of lubricating oil which is thrown up by the rotation of said large diameter ring gear so as to be supplied to said second bearing in a splashing fashion; and
    a lubricating oil supply path formed in said housing such as to link up with said first bearings at one end and with said gutter at the other end thereof.

2. The final reduction gear unit according to claim 1, wherein said lubricating unit defines a splash guide space formed in said housing for guiding the lubricating oil thrown up by the rotation of said large diameter ring gear toward said second bearing in a splashing fashion, and
    wherein said gutter member is provided such that said gutter member extends in a transverse direction so as to partially close said splash guide space.

3. The final reduction gear unit according to claim 1, wherein said first bearing comprises a pair of first bearings disposed on both sides of said large diameter ring gear, and said gutter member links up with said pair of first bearings via said lubricating oil supply path.

4. The final reduction gear unit according to claim 3, wherein said gutter member is formed such as to extend across an periphery of said large diameter ring gear toward said pair of first bearings.

5. The final reduction gear unit according to claim 1, wherein said gutter member has a substantially U-shaped cross section.

6. A final reduction gear unit for transmitting a driving force transmitted from a drive shaft to axles extending transversely of a vehicle body and linking up with left and right wheels, comprising:
    a small diameter pinion gear being rotatively driven by receiving output rotations from said drive shaft;
    a large diameter ring gear meshing with said small diameter pinion gear and linking up with said axles coaxially;
    a housing accommodating therein said small diameter pinion gear and said large diameter ring gear;

a first bearing for rotatably supporting said large diameter ring gear relative to said housing;

a second bearing for rotatably supporting said small diameter pinion gear relative to said housing; and a lubricating unit lubricating said first and second bearings, said lubricating unit comprising:

a gutter member provided in said housing such as to extend across an periphery of said large diameter ring gear toward said first bearing, said gutter member being opened toward a rotating direction of said large diameter ring gear at the forward running of a vehicle; and a lubricating oil supply path formed in said housing such as to link up with said first bearings at one end and with said gutter at the other end thereof.

* * * * *